United States Patent [19]

Peterson

[11] 3,738,614
[45] June 12, 1973

[54] HOISTING APPARATUS EMPLOYING UNITARY CLUTCH AND BRAKE ASSEMBLY

[76] Inventor: Earl A. Peterson, 4111 Chestnut Avenue, Long Beach, Calif.

[22] Filed: May 13, 1971

[21] Appl. No.: 143,141

[52] U.S. Cl. .............................. 254/187, 192/17 R
[51] Int. Cl. ............................................. B66d 1/00
[58] Field of Search .................. 254/150, 187, 185; 192/17 R, 17 A

[56] References Cited
UNITED STATES PATENTS

| | | | |
|---|---|---|---|
| 2,983,348 | 5/1961 | Ott | 192/17 A |
| 3,367,460 | 2/1968 | Wanner | 192/17 R |
| 3,572,482 | 3/1971 | Kalpas | 254/187 |
| 3,606,257 | 9/1971 | Wilson | 254/187 |

FOREIGN PATENTS OR APPLICATIONS

| | | | |
|---|---|---|---|
| 1,201,371 | 12/1959 | France | 254/173 |

Primary Examiner—Harvey C. Hornsby
Attorney—Spensley, Horn & Lubitz

[57] ABSTRACT

In combination with a drawworks hoist, a continuously slipping clutch is employed with apparatus for applying controlled torque or braking to the drawworks hoist. A drawworks hoist is used to provide in-haul and overhaul action to a coupled drum, the drum being wound with appropriate cabling. A continuously slipping clutch will drive the drawworks shafts in an in-haul direction through an overrunning clutch when it is desired to maintain a controlled tension on the cable irrespective of vertical movement of the drawworks hoist assembly. The continuously slipping clutch will be disengaged from the drawworks hoist shaft when the drawworks is reeling the cable in an in-haul direction. When the cable is being payed out, the continuously slipping clutch provides supplemental braking by securing the driving member of the continuously slipping clutch to the fixed frame of reference.

11 Claims, 7 Drawing Figures

Patented June 12, 1973

EARL A. PETERSON
INVENTOR

BY

SPENSLEY, HORN & LUBITZ
ATTORNEYS

Patented June 12, 1973

EARL A. PETERSON
INVENTOR

BY

SPENSLEY, HORN & LUBITZ
ATTORNEYS

EARL A. PETERSON
INVENTOR

BY

SPENSLEY, HORN & LUBITZ
ATTORNEYS

HOISTING APPARATUS EMPLOYING UNITARY CLUTCH AND BRAKE ASSEMBLY

BACKGROUND OF THE INVENTION

1. Field of the Invention

The present invention drawworks hoist employing a unitary clutch-brake assembly is generally related to the field of hoists or winches and, more particularly, to those hoists or winches employing continuously slipping clutch assemblies which provide alternative braking and torque action.

2. Prior Art

The increased activity in the field of off-shore oil exploration has emphasized the need for improved equipment to operate under the difficult environmental conditions inherent in the geographical locations where such activities take place. The prior art discloses the use of drawworks hoists or winches for raising and lowering such loads as drill strings, hook blocks or other heavy loads which are commonly encountered in such applications.

A typical drawworks hoist described in the prior art used for hoisting heavy loads utilizes a reel or drum keyed to a shaft, the shaft being securely journeled to a fixed hoist frame or other stationary structure. Torque is transmitted to the shaft of the drawworks hoist by controllable clutches which provide in-haul or out-haul action to a cable wrapped upon the drum or reel. In order to provide primary braking where the cable is being payed out, band brakes or other suitable braking systems are provided.

A device disclosed by the prior art utilizes a combination clutch/brake assembly for drawworks hoists. The device disclosed by the prior art employs a positive engagement clutch wherein the housing thereof constitutes the driven member and is a part of the drum. The hub of the clutch constitutes the driving member thereof and additional means are provided to prevent movement of the driving member thereby allowing the clutch to act as a brake when the drawworks are operating in an out-haul mode. One of the problems which have arisen in attempting to utilize drawworks hoists in off-shore applications or in any other applications where there will be vertical movement of the drawworks hoists is the ability to maintain controlled tension on the cable. In the case of drilling operations, it is important to maintain constant or controlled tension on the drill string irrespective of the vertical movement of the drawworks. The devices disclosed by the prior art fail to solve the acute problem created by the environmental conditions inherent in such applications.

The present invention drawworks hoist utilizing a continuously slipping clutch-brake assembly substantially solves those problems left unresolved by the devices disclosed in the prior art. A drawworks hoist or winch having conventional driving and braking systems are combined with a clutch adapted to operate in a continuously slipping mode whereby controlled tension can be applied to a predetermined shaft. When the drawworks hoist or winch is operating in an in-haul mode, the continuously slipping clutch will be disengaged. When the drawworks hoist or winch is operating in an out-haul mode, the unitary continuously slipping clutch-brake assembly will be active as a supplemental braking system thereby negating the need for additional components such as commercially available systems designated as Hydromatic or Dynamatic supplemental brakes. Where it is necessary to maintain a controlled tension on the cable, the unitary clutch-brake assembly will be engaged to the drum shaft to compensate for upward or downward movement of the drawworks hoist while maintaining a controlled tension on the cable and therefore the supported drill string or other load being used therewith.

SUMMARY OF THE INVENTION

The gist of the invention is an improved drawworks hoist or winch utilizing a unitary clutch-brake assembly. A drawworks hoist or winch employs two or more power sources, typically, D.C. motors and provide both high speed and low speed power to the drawworks hoist. Each motor drives a common input shaft which in turn is coupled through chain drives to a jack shaft. The high speed and low speed outputs of the jack shaft are selected by a gear tooth clutch disposed between the high and low speed sprockets driven by the input shaft. The power and speed output of the jack shaft is applied to respective ends of a suitably journeled drum or reel. One end of the jack shaft output is coupled to a high speed drum clutch and the other end coupled to a low speed drum clutch, the high and low speed drum clutches engaging the respective power input to the shaft and drum of the drawworks or winch.

In order to provide means whereby the drawworks assembly can maintain the cable in a controlled tension mode, the drum shaft of the drawworks is extended through a one-way clutch to a unitary clutch/brake combination. The clutch operates in a manner such that the driving and driven elements thereof are in a continuously slipping relationship with respect to one another, the torque being transmitted from the driving elements to the driven element being controlled. The clutch assembly and its relationship to the shaft attached to the driven element is similar to that described in applicant's United States Letters Patent, No. 3,373,972. The shaft being driven by the continuously slipping clutch is engaged to one portion of a one-way clutch, the shaft associated with the drawworks or winch drum being coupled to the other portion of the one-way clutch. When the continuously slipping clutch is engaged to operate as a torque transmitting element, an in-haul force will be imposed upon the drawworks or winch drum in a manner to maintain the cable used therewith in a controlled tension mode. When either of the high speed or low speed clutches of the drawworks are engaged, the one-way clutch will operate in an overrunning condition thereby disengaging the drawworks or winch shaft from the shaft integral with the continuously slipping clutch-brake assembly. The continuously slipping clutch-brake assembly is also operable as a supplemental brake by providing a manual or hydraulically operated retardent to prevent rotation of the driving member of the clutch and referencing same to the frame or other fixed reference of the drawworks hoist or winch assembly.

It is therefore an object of the present invention to provide a hoist or winch which employs a unitary clutch-brake assembly capable of imposing controlled tension conditions.

It is another object of the present invention to provide an improved hoist or winch to be operated by a continuously slipping clutch for maintaining controlled tension on the drawworks or winch cable.

It is still another object of the present invention to provide an improved hoist or winch assembly utilizing a unitary clutch/brake assembly which is engaged through an overrunning clutch.

It is yet another object of the present invention to provide an improved hoist or winch assembly utilizing the braking of a continuously slipping clutch/brake assembly in the out-haul mode.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

DESCRIPTION OF THE PRESENTLY PREFERRED EMBODIMENT

Figure 1:
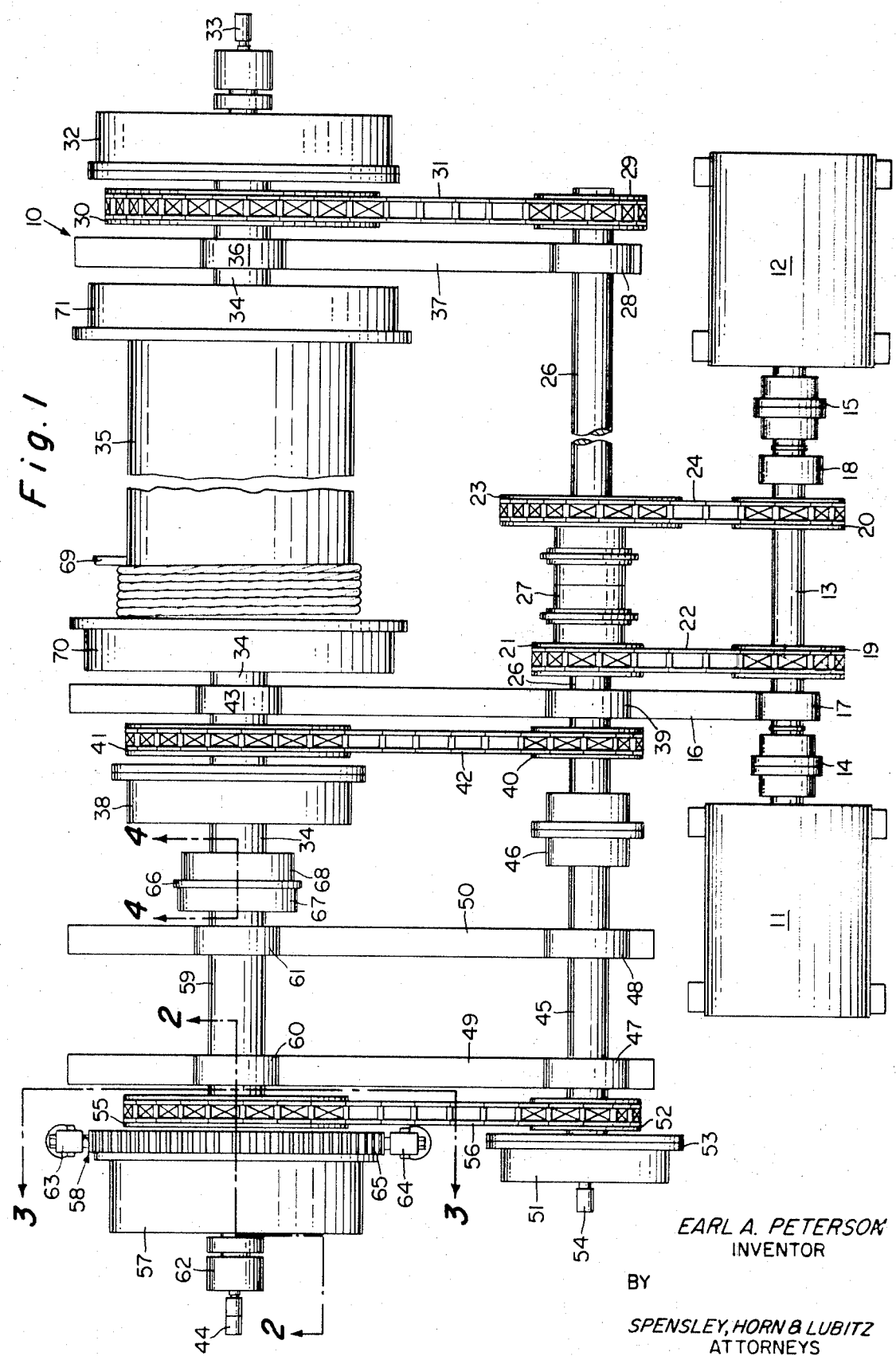
FIG. 1 is a top, plan view of a drawworks hoist utilizing a unitary clutch-brake assembly in accordance with the present invention.

An understanding of the present invention can be best gained by reference to FIG. 1 wherein a drawworks hoist utilizing a unitary clutch-brake assembly is shown therein in accordance with the present invention, the drawworks being generally designated by the reference numeral 10. Drawworks hoist 10 is powered by motors 11 and 12. Although the scope of the present invention embodies the use of any of a number and type of suitable power sources, motors 11 and 12 preferably comprise series wound D.C. motors typically having a power output in the range of 700 horsepower each. The output shaft of motor 11 is coupled to input shaft 13 by way of conventional shaft coupling 14. The shaft output of motor 12 is coupled to input shaft 13 by way of conventional shaft coupling 15. Shaft couplings 14 and 15 are conventional coupling devices for mechanically coupling the torque output of motors 11 and 12 to input shaft 13, shaft couplings 14 and 15 being conventional devices known to one having skill in the art. Drawworks hoist 10 is supported by rigid hoist frame 16 or other suitable stationary reference, input shaft 13 being rotatably mounted or otherwise journeled in suitable bearings 17 and 18 of fixed frame 16.

The torque imposed upon input shaft 13 is transmitted to the remainder of drawworks hoist 10 via drive sprockets 19 and 20 concentrically disposed about input shaft 13 substantially adjacent bearings 17 and 18 respectively. Drive sprockets 19 and 20 are typically chain drive sprockets, but they can be other suitable torque transmitting devices such as pullies. Drive sprockets 19 and 20 concurrently supply power to jack shaft 26, gear tooth clutch 27 selecting either sprocket 21 or sprocket 23, the power of both motors 11 and 12 being transmitted through the selected sprockets 21 or 23. This will be explained in detail below. Although the number of drive sprockets 19 and 20 are shown to be equal, the number of drive sprockets 20 typically exceeds the number of drive sprockets 19 to provide additional torque transmitting capacity.

Drive sprocket 19 is coupled to driven sprockets 21 by chain drive 22 and drive sprocket 20 is coupled to sprockets 23 by chain drive 24. Sprockets 21 and 23 are rotatably mounted upon shaft 26. Sprockets 21 or 23 are selectively coupled to shaft 26 by gear tooth clutch 27 which is secured to shaft 26. Although the scope of the present invention is broad enough to cover the use of any suitable power transmission devices, transmission 27 is preferably a two-speed gear tooth clutch transmission. Where transmission 27 is a two-speed transmission, drawworks hoist 10 has four operating modes based upon the selected speed and torque output.

One end of shaft 26 is journeled in suitable bearings 28, the extended end of shaft 26 having mounted thereon sprockets 29. Sprockets 29 are coupled to sprockets 30 by way of chain drive 31. Sprockets 30 are secured to the housing of low-speed drum clutch 32. Although low-speed drum clutch 32 can be implemented through the use of conventional clutches, low-speed drum clutch 32 is preferably an air actuated clutch providing for positive engagement between the driving and driven elements thereof. Actuation of low-speed drum clutch 32 is provided via conventional roto-coupling 33 through which the activating air lines for engaging and disengaging low-speed drum clutch 32 are directed. When low-speed drum clutch 32 is engaged, the torque output thereof will appear upon shaft 34 thereby being transmitted to drum 35. Drum 35 is keyed or otherwise secured to shaft 34 in a conventional manner, the manner of securing drum 35 to shaft 34 not being part of the present invention. Shaft 34 is journeled in suitable bearings 36 of fixed frame 37. Power is transmitted to high-speed drum clutch 38 in a similar manner to that utilized to the transmission of power to low-speed drum clutch 32. The second end of shaft 26 is journeled in suitable bearings 39 of frame 16. This end of shaft 26 having concentrically disposed thereon sprockets 40. Sprockets 40 are coupled to sprockets 41 by chain drive 42, sprockets 41 being secured to the clutch housing or driving member of high-speed drum clutch 38. Torque transmitted through high-speed drum clutch 38 is supplied to drawworks hoist shaft 34 and to the keyed drawworks hoist drum or reel 35. The portion of drawworks hoist shaft 34 adjacent high-speed drum clutch 38 is journeled in suitable bearings 43 of fixed frame 16. Although the scope of the present invention embodies any number of suitable, conventional clutches to implement high-speed drum clutch 38, high-speed drum clutch 38 is preferably implemented through the use of an air actuated, ventilated disk clutch. Control lines for supplying air actuation is axially disposed through the drawworks hoist drum shaft 34 and those shafts in end abutment thereto, the air being input at roto-coupling 44.

Shaft 26 is coupled to shaft 45 via conventional shaft coupling 46, shaft 45 being journeled in suitable bearings 47 and 48 of fixed frames 49 and 50 respectively. Shaft 45 is the input shaft to clutch 51. Although it is within the scope of the present invention to utilize any number of conventional clutches, clutch 51 is preferably an air actuated disk clutch. Shaft 45 is connected to the hub of clutch 51 which in turn supports an internal friction disk (not shown). Rotably mounted on the hub of clutch 51 is housing 53 which in turn supports the friction elements of the clutch. Sprockets 52 are secured to housing 53 of clutch 51, and when clutch 51 is actuated through roto-coupling 54, the torque imparted by shaft 45 is driven through clutch 51 to sprockets 52. Sprockets 52 are coupled to sprockets 55 by chain drive 56.

Clutch 57 is one capable of operating in a continuously slipping mode whereby there is a controllable differential speed between the input and output of clutch 57. Sprockets 55 are connected to and impart rotational power to drive ring 58, drive ring 58 being secured to the housing of clutch 57. Sprockets 55 and drive ring 58 are rotably mounted upon shaft 59 which is in turn journeled in suitable bearings 60 and 61 of fixed frames 49 and 50 respectively. Shaft 59 is coupled to the driven element of clutch 57 which in this case constitutes the hub (not shown) of clutch 57. Although it is within the scope of the present invention to implement clutch 57 by a number of conventional clutches, clutch 57 is preferably an air actuated, water cooled disk clutch capable of operating in a continuously slipping mode wherein there is a controlled differential speed between the hub and housing and therefore the friction disk and friction elements of the clutch. In this form of the present invention, actuation of clutch 57 is accomplished through the use of air coupling 44 and the water input and output to the continuously slipping clutch is at conventional roto-coupling 62.

In order to meet an objective of the present invention whereby drawworks hoist 10 employs a continuously slipping clutch-brake assembly, gear tooth stops 63 and 64 are disposed in substantially opposed positions, stops 63 and 64 being adapted to engage gear teeth 65 uniformly disposed about the circumference of drive ring 58.

In a preferred embodiment of the present invention, shaft 59 and drum shaft 34 are coupled by overrunning, one-way clutch 66 to be discussed in detail below. Shaft 59 is secured to outer races 67 and drum shaft 34 is secured to inner race 68. As will be explained, when either high speed drum clutch 38 or low speed drum clutch 32 is engaged to rotate drum 35 in the in-haul direction, overrunning, one-way clutch 66 will be disengaged allowing inner race 68 to be free wheeling with respect to outer race 67. When drum 35 is being rotated in an over-haul load, overrunning clutch 66 will be engaged thereby transmitting the torque of drum shaft 34 to shaft 59. In this mode, continuously slipping clutch 57 will act as a brake when stops 63 and 64 engage drive ring 58. When continuously slipping clutch 57 is driving shaft 59 in an in-haul direction, overrunning clutch 66 will be engaged thereby permitting the maintenance of controlled tension in cable 69 wound about drum 35. Although the preferred embodiment of the present invention utilizes overrunning, one-way clutch 66 to couple shafts 59 and 34, shafts 59 and 34 could be a single shaft with control means provided for actuating clutch 57 (input air) in the overhaul motion compensation modes and disengage clutch 57 (output air) when clutches 32 or 33 are operating in the in-haul mode.

In a typical off-shore oil drilling operation where the present invention is in the form of a drawworks hoist, the problem of drawing the drill string from the hole to replace the bit or apply other maintenance procedures requires that large loads be imposed upon drawworks hoist 10. Loads can be as high as 400,000 lbs. When the drill string is being raised, motors 11 and 12 will supply power for the transfer of torque to low speed drum clutch 32. As mentioned, through the use of transmission 27, the present invention drawworks hoist 10 will be capable of operating at four stages of speed and torque depending upon which power source and which speed is used. Where low speed in-haul operation is encountered, shaft 26 will provide rotational power to sprockets 29 which in turn will transmit rotational power to sprockets 30, the torque imposed being partially dependent upon the gear ratio between sprockets 29 and 30. When low speed drum clutch 32 is engaged, the power will be transmitted through the friction element and friction disk (not shown) of low speed drum clutch 32 and therefore through drum shaft 34. As stated, the rotation of drum shaft 34 in the in-haul mode will disengage overrunning clutch 66 thereby permitting rotation in a free wheeling mode. When the load imposed upon cable 69 is sufficiently reduced to permit high speed in-haul operation, high speed drum clutch 38 can be engaged to reel in cable 69 in a manner similar to that described for low speed drum clutch 32.

Under the requirements of a conventional in-haul operation, clutch 51 and continuously slipping clutch 57 can be disengaged since neither will be needed for that mode of operation. When the present invention drawworks hoist 10 is paying out cable 69 in an overhaul condition, continuously slipping clutch 57 will be operated as a supplemental brake to band brake assemblies 70 and 71. Stops 63 and 64 will be positioned to engage gear teeth 65 of drive ring 58 to render drive ring 58 stationary with respect to fixed frame 49. Since continuously slipping clutch 57 is operating in a continuously slipping mode, the braking action imposed on shaft 59 will be controlled through the air actuation supplied at coupling 54. When drum shaft 34 is rotating in an overhaul condition, as will be explained below, overrunning clutch 66 is engaged or locked thereby coupling shaft 34 and 59.

When it is desired to impose a controlled tension on cable 69, clutch 51 will be engaged to positively couple the rotational power imposed on shaft 45 to the drive sprockets 55 and therefore drive ring 58. As will be explained, the continuously slipping mode of clutch 57 will enable controlled tension to be imposed upon cable 69, the operation thereof being similar to that described in applicant's United States Letters Patent No. 3,373,972.

Figure 2:
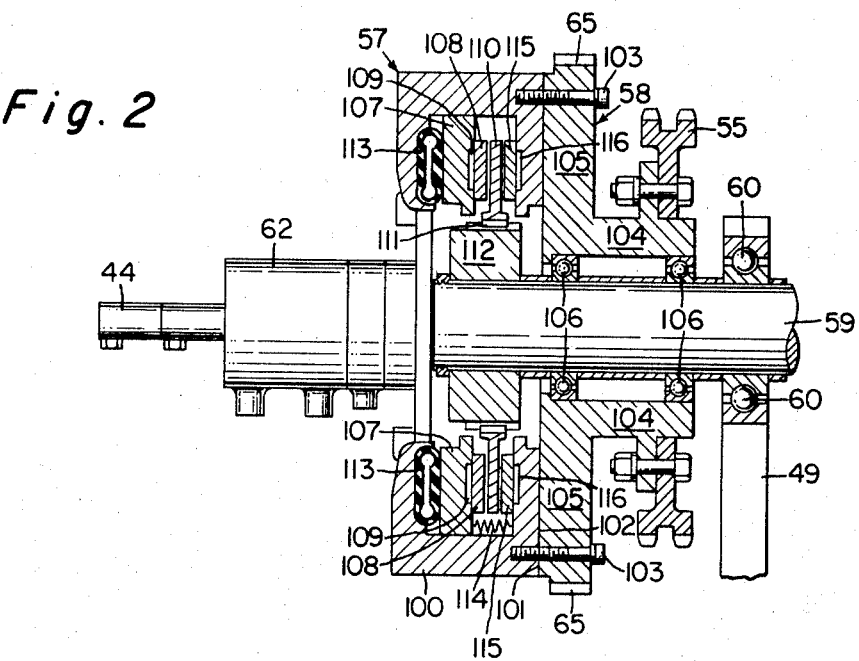
FIG. 2 is a side, elevation view, shown in partial cross-section, of the unitary clutch-brake assembly of FIG. 1, taken through line 2—2 of FIG. 1.

An understanding of the unitary clutch-brake assembly for the present invention drawworks hoist 10 can be best seen by reference to FIG. 2 wherein an enlarged cross-sectional side elevation view is shown therein. As stated, it is within the scope of the present invention to implement continuously slipping clutch 57 through the use of torque transmitting clutches having heat dissipation characteristics suitable to permit significant speed differentials between the input and output friction elements of the clutch. It is preferred that an air actuated, liquid cooled disk clutch be used to implement clutch 57. Clutch 57 comprises a substantially cylindrical like housing 100, axial surface 101 thereof being secured to longitudinal surface 102 of drive ring 58, housing 100 being secured to drive ring 58 by conventional bolts 103. Shaft 59 is rotatably mounted to frame 49, shaft 59 being journeled in suitable bearings 60. Drive ring 58 is comprised of hub 104, an end thereof being radially extended into ring portion 105, the circumferential surface of ring 105 bearing uniformly disposed gear teeth 65. Drive ring 58 is rotatably mounted upon shaft 59, drive ring 58 being journeled on bearings 106. Sprockets 55 are radially secured to a portion of hub 104 of drive ring 58, sprockets 55 as shown in FIG. 2 having two sets of sprocket teeth for receiving chain drive 56 (FIG. 1). Sprockets 55 can be mounted upon hub 104 by suitable means.

Slidingly adjacent the inner axial surface of housing 100 are friction plate carriers 107, friction plate carriers 107 being adapted to receive driving friction elements 108. Friction elements 115 are secured to an interior receiving surface of housing 100 adjacent the surface of friction disk 110 opposite friction elements 108. Annularly disposed within driving friction plate 107 and adjacent driving friction elements 108 is annular channel 109. Annularly disposed within housing 100 adjacent friction elements 115 is annular channel 116. Annular channels 109 and 116 are adequate to receive sufficient liquid for dissipating heat created by the frictional engagement of friction elements 108 and 115 and friction disk 110. Friction disk 110 is securely mounted by spline teeth 111 on clutch hub 112. Hub 112 is keyed or otherwise secured to shaft 59.

In order to engage clutch 57, air is introduced to expandable elements 113 by appropriate fittings not shown. Friction plate carriers 107 being slidably engaged to the interior wall of housing 100 will axially move along the axis of shaft 59 through the alternative action of expandable elements 113 and return spring 114. Friction plate carriers 107 have no rotational motion with respect to housing 100 while permitting axial movement. Air is introduced for expanding expandable elements 113 at air coupling 54 and liquid coolant is introduced at roto-coupling 62 to provide an inlet and outlet for the coolant disposed within annular channels 109 and 116, the connections to roto-coupling 62 not shown.

In order for clutch 57 to act as a continuously slipping clutch or brake, clutch 57 must be capable of fully dissipating the heat horsepower generated by the frictional engagement between driving friction elements 108 and 115 and friction disk 110. When the present invention drawworks hoist 10 is operating in the mode whereby cable 69 (FIG. 1) is to be maintained at a controlled tension, clutch 57 will be engaged. Drive power is supplied by rotating sprocket 55 which in turn causes a given rotational speed and torque to be applied to housing 100 and friction plate carriers 107. The degree of tension is dependent upon the frictional engagement between driving friction elements 108 and 115 and driven friction plate 110. Air is introduced into expandable elements 113 which in turn will cause friction plate carriers 107 to be slidably moved. Since friction elements 115 are substantially stationary, driven friction disk 110 will be frictionally engaged between the opposing surfaces of friction elements 108 and 115. By providing a controlled speed differential between driving friction elements 108 and 115 and friction disk 110, the torque imposed upon shaft 59 can be controlled thereby maintaining a controlled tension on cable 69 (FIG. 1).

When the present invention drawworks hoist 10 is being operated in the mode whereby controlled tension is to be maintained in cable 69, two objectives may be achieved. Where drawworks 10 is in an environment where motion compensation is required, constant tension may be maintained on cable 69 through the use of slipping clutch 57. Where motion compensation is required, it is typically necessary to maintain the relative stability of cable 69 irrespective of the motion of drawworks hoist 10. In this case, driving friction elements 108 and 115 will be driven at a speed which is greater than the recovery rate necessary to reel in cable 69. When cable is being payed out, clutch 57 will be in an over-haul mode whereby shaft 59 reverses directions thereby increasing the relative differential speed between driving friction elements 108 and 115 and driven friction disk 110. The manner in which constant tension can be achieved is described in applicant's United States Letters Patent No. 3,373,972. Where clutch 57 is to be used as a continuously slipping brake, gear tooth stops 63 and 64 are positioned to engage relative motion between clutch housing 100 and frame 49, cable 69 will be payed out with unitary structure of clutch 57 acting as a supplemental braking system to brake units 70 and 71.

Figure 3:
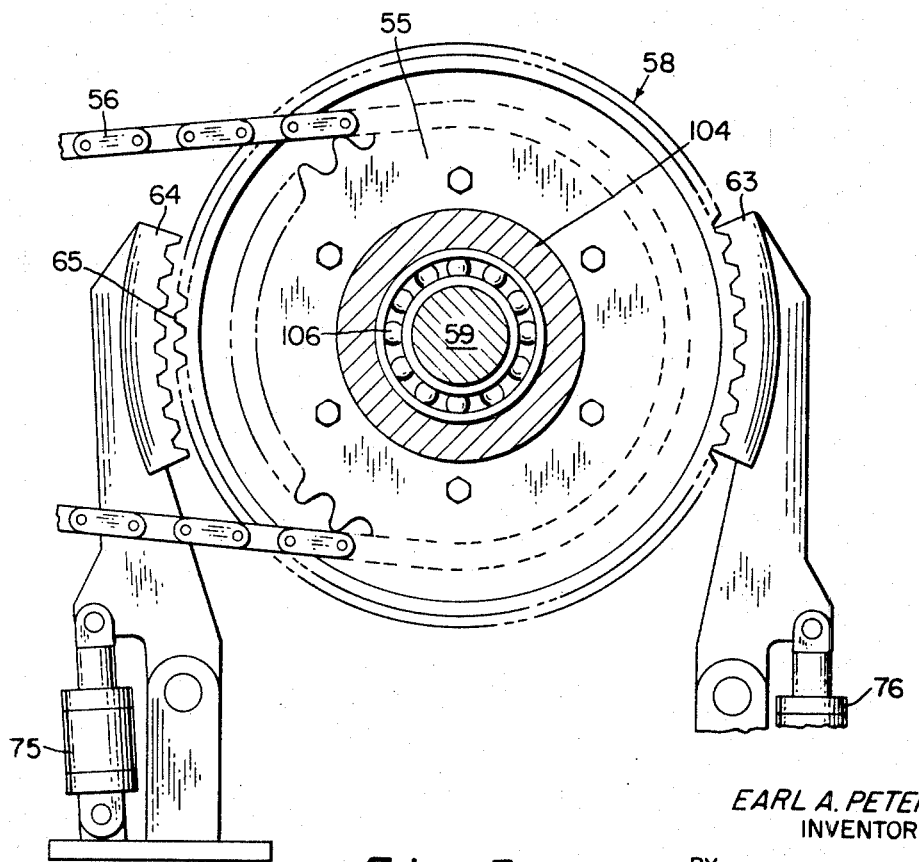
FIG. 3 is a side, elevation view of the input to and output of the unitary clutch-brake assembly of FIG. 1 taken through line 3—3 of FIG. 1.

Referring now to FIG. 3, the relationship of the input driving power and the conversion of clutch 57 into a braking structure can be best seen. Shaft 59 has disposed thereabout suitable bearings 106 upon which a hub 104 of drive ring 58 is journeled. As can be seen from FIG. 3, sprocket 55 is concentrically disposed about shaft 59 and is secured to the portion of drive ring 58 by appropriate bolts and receiving nuts as shown in FIG. 2. Chain drive 56 is disposed about slightly more than one-half of the exposed teeth of sprocket 55, chain drive 56 coupling sprockets 55 and 52 as shown in FIG. 1. The circumferential surface of gear portion 105 of drive ring 58 is extended into a plurality of gear teeth 65 uniformly disposed about the circumference of portion 105. To convert clutch 57 to operate as a braking assembly, gear teeth stop 63 and 64 are engaged with a predetermined number of gear teeth 65 eliminating the relative motion between drive ring 58 and the frame of the present invention drawworks hoist 10. FIG. 3 illustrates, for the purpose of example only, gear teeth stop 63 engaging gear teeth 65 and gear teeth stop 64 disengaged therefrom. Although it is within the scope of the present invention to implement gear teeth stops 63 and 64 by manually moveable elements, it is preferred that gear teeth stops 63 and 64 utilize hydraulically actuated cylinders 75 and 76 respectively.

Figure 4:
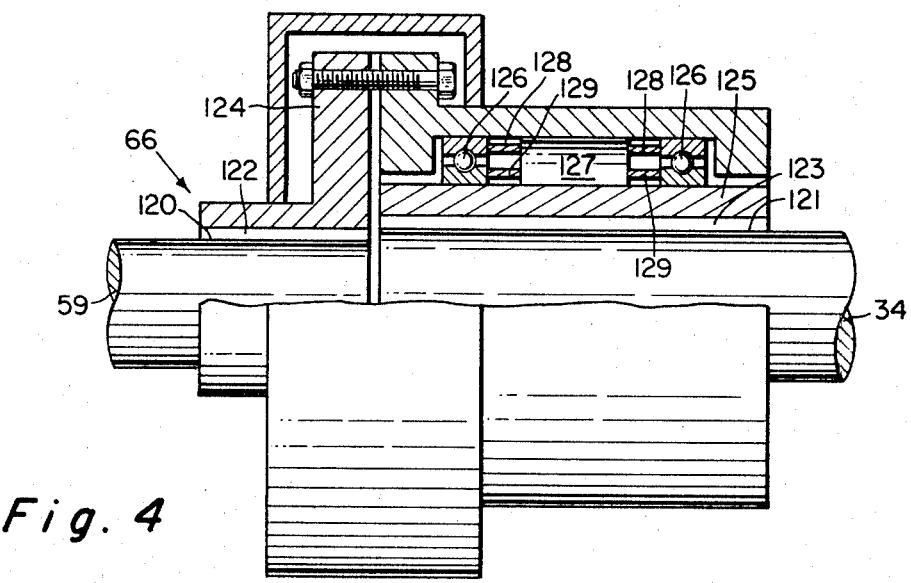
FIG. 4 is a cross-sectional view of a typical overrunning clutch used in accordance with the present invention taken along line 4—4 of FIG. 1.

In order to implement drawworks hoist 10 to utilize a unitary clutch-brake assembly which operates in a continuously slipping mode and one which will provide for applying controlled tension in cable 69, overrunning, one-way clutch 66 is interposed between shaft 59 and drum shaft 34. Referring now to FIG. 4 and FIGS 5a, 5b and 5c, the operation of overrunning, one-way clutch 66 can be better understood. FIG. 4 illustrates, in schematic form, a cam clutch used to implement one-way clutch 66. Although it is within the scope of the present invention to utilize other conventional methods to implement one-way clutch 66, such as a ratchet and pawl configurations, it is preferred that one-way clutch 66 be implemented through the use of a cam clutch coupling.

The schematic, partial cross-sectional view of a cam clutch utilized to implement one-way clutch 66 is shown in FIG. 4. Axially disposed on opposite ends of one-way clutch 66 are cylindrical bores 120 and 121 for receiving shafts 59 and 34 respectively. Keys 122 and 123 are axially aligned with cylindrical bores 120 and 121 respectively and will prevent inadvertent rotation of the shaft with respect to one-way clutch 66. Shaft 59 will be secured to outer race 124 and drum shaft 34 will be secured to inner race 125. Inner race 125 is rotatably disposed within outer race 124, inner race 125 being suitably journeled within outer race 124 by bearings 126. Cams 127 frictionally engage the inner cylindrical surface of outer race 124 and the outer cylindrical surface of inner race 125. The orientation of cams 127 is controlled by outer cage 128 and inner cage 129.

Figure 5A:
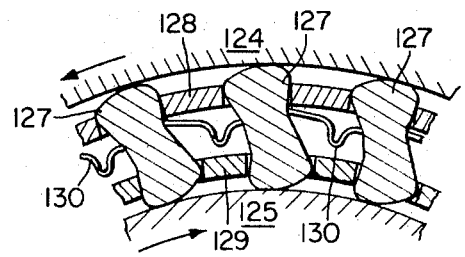
FIGS. 5a, 5b and 5c are schematic, partial cross-sectional views of an overrunning clutch illustrating the mode of operations thereof.
Figure 5B:
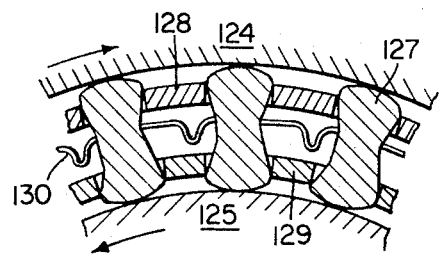
Figure 5C:
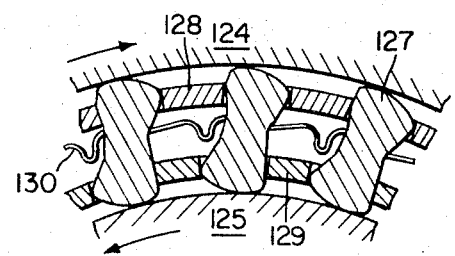

The operation of one-way clutch 66 can be best seen by reference to FIG. 5a, FIG. 5b and FIG. 5c wherein schematic views of the operation of one-way clutch 66 are shown. As stated, one-way clutch 66 is used to allow drum shaft 34 to free wheel with respect to shaft 59 when either high speed drum clutch 38 or low speed drum clutch 32 is rotating drum 35 in an in-haul mode. One-way clutch 66 will effectively lock drum shaft 34 and shaft 59 when drum 35 is paying out cable 69 in an over-haul mode, and one-way clutch 66 will effectively lock drum shaft 34 and shaft 59 when continuously slipping clutch 57 is maintaining cable 69 in a controlled tension mode.

Referring now to FIG. 5a, the free wheeling mode of one-way clutch 66 is illustrated therein. Inner race 125 and outer race 124 will be free wheeling with respect to each other when the respective angular rotation is as shown. Inner race 125 is being rotated in a clockwise manner whereby cable 69 is being reeled in upon drum 35 through the action of either high speed drum clutch 38 or low speed drum clutch 32. Inner cage 129 and outer cage 128 are concentric with respect to each other, each transverse edge of each section of inner cage 129 and outer cage 128 contacting a point on a cam 127. In this mode, inner cage 129 rotates clockwise with respect to outer cage 128 orientating cams 127 to allow inner race 125 to be in an overrunning condition with respect to outer race 124. Since the top and bottom surfaces of cams 127 are not forced against the respective radial surfaces of inner and outer races 125 and 124, the shafts coupled to inner and outer races 125 and 124 will be effectively disengaged from each other thereby precluding the transmission of torque from one shaft to the other. Springs 130 insure that cams 127 maintain contact with races 124 and 125.

Referring now to FIG. 5b, the mode of operation whereby outer race 124 is rotated clockwise with respect to inner race 125 thereby effectively engages one-way clutch 66 and provides for the transmission of torque from shaft 59 to drum shaft 34. This mode of operation will arise when continuously slipping clutch 57 is being used to maintain a controlled tension in cable 69. As can be seen by comparing FIG. 5b with FIG. 5a, outer cage 128 and inner cage 129 have rotated clockwise with respect to each other forcing cams 127 to rotate clockwise thereby loading one-way clutch 66 and effectively locking shaft 59 and drum shaft 34. The loading of one-way clutch 66 will provide for the transmission of torque from shaft 59 to drum shaft 34 thereby establishing the controlled tension mode for the present invention drawworks hoist 10. Where one-way clutch 66 is over-hauled due to motion of drawworks hoist 10, one-way clutch 66 will maintain the relative engagement shown in FIG. 5b thereby providing a controlled tension mode for drawworks hoist 10.

Referring now to FIG. 5c, one-way clutch 66 is illustrated under the mode whereby inner race 125 is rotated counter-clockwise with respect to outer race 124, this mode arising out of the need to pay out cable 69 in an over-haul application. In this mode, continuously slipping clutch 57 will be used as a supplemental brake by engaging stops 63 and 64 and drive gear 58 (FIG. 3). In this configuration, outer cage 128 will be rotated clockwise with respect to inner cage 129 thereby fully loading cams 127 and allowing the transmission of counterclockwise rotation from inner race 125 to outer race 124. Where there is effective engagement between drum shaft 34 and shaft 59, continuously slipping clutch 57 will act as a supplemental brake to band brakes 70 and 71 enhancing the operation of the present invention drawworks hoist 10. As stated, since continuously slipping clutch 57 is operated as a continuously slipping brake in this mode, actuation of expandable elements 113 (FIG. 2) allows the amount of supplemental braking to be controlled. Since continuously slipping clutch 57 is adapted to dissipate the heat horsepower arising out of the continuous slippage between friction elements 108 and 115 and friction disk 110 (FIG. 2), the overall operation of drawworks 10 is vastly improved. The ability to utilize a single unit to operate as a clutch and brake as well as provide a controlled tension mode to drawworks hoist 10, substantially solves problems in a manner which has heretofore not been achieved.

I claim:

1. In combination with a hoisting assembly including a rigid frame, a drum securely mounted upon a drum shaft journeled on the rigid frame, a cable wound about the drum one end thereof being secured to the drum, a drum clutch coupled to the drum shaft for transferring in-haul and over-haul rotational power from a power source to the drum shaft, a unitary clutch and brake apparatus comprising:
   a. a continuously slipping clutch assembly having an inner hub and outer housing adapted to frictionally rotate with respect to each other and fluid means for dissipating the frictionally generated heat therein, and a clutch shaft being secured to said inner hub;
   b. a drive ring coupled to said outer housing;
   c. braking means for securing said drive ring and said coupled housing to the rigid frame, said braking means adapted to engage said drive ring;
   d. power means for rotating said drive ring and said coupled housing; and
   e. a one-way clutch interposed and axially coupled between said clutch shaft and said drum shaft and having means for disengaging said clutch shaft and said drum shaft when said hoisting assembly is reeling in said cable, and means for engaging said clutch shaft and said drum shaft when said cable is being payed out.

2. A combined clutch and brake assembly as defined in claim 1 wherein said drive ring has a substantially circular annular projection and gear teeth uniformly disposed about the circumference thereof, and said braking means includes gear teeth stops adapted to engage the gear teeth of said drive ring.

3. A combined clutch and brake assembly as defined in claim 1 wherein said continuously slipping clutch includes a friction disk secured to said inner hub, friction elements adapted to slidably engage and rotate with said outer housing, said fluid means for dissipating heat adjacent said friction elements, and air actuated, expandable elements secured to said housing and adjacent said friction elements whereby said friction elements frictionally engage said friction disk upon actuating said expandable elements.

4. A combined clutch and brake assembly as defined in claim 3 wherein said power means comprises a rotating power source, a sprocket coupled to and parallel with said drive ring and a chain drive coupling said rotating power source and said sprocket.

5. A hoisting apparatus comprising:
   a. drawworks including a rigid frame, a drum securely mounted on a drum shaft rotatably supported on the rigid frame, a cable disposed about said drum, one end thereof being secured to said drum, at least one clutch having an engageable hub and housing, the hub of said one clutch being securely coupled to said drum shaft, a power source coupled to the housing of said clutch whereby said cable is reeled in or payed out when said clutch is engaged or disengaged respectively;
   b. a continuously slipping clutch and brake assembly having an inner hub and outer housing adapted to frictionally rotate with respect to each other and liquid means for dissipating the frictionally generated heat therein, and a clutch shaft being secured to said inner hub and journeled on said rigid frame;
   c. a drive ring having an inner cylindrical hub journeled on said clutch shaft and a radially projecting gear having uniformly disposed gear teeth on the outer circumferential surface thereof, said ring being coupled to the housing of said continuously slipping clutch;
   d. braking means for securing said drive ring and said coupled housing to said rigid frame, said braking means adapted to be engaged by said drive ring;
   e. power means for rotating said drive ring and said coupled housing; and
   f. a one-way clutch interposed and axially coupled between said clutch shaft and said drum shaft and having means for disengaging said clutch shaft and said drum shaft when said drawworks is reeling in said cable, and means for engaging said clutch shaft and said drum shaft when said cable is being payed out.

6. A hoisting apparatus as defined in claim 5 wherein said one-way clutch further includes means for engaging said clutch shaft and said drum shaft when said continuously slipping clutch drives said clutch shaft and maintains the cable in a controlled tension mode.

7. A hoisting apparatus as defined in claim 6 wherein said continuously slipping clutch includes a friction disk secured to said inner hub, friction elements adapted to slidably engage and rotate with said outer housing, annular channels disposed adjacent said friction elements, and air actuated, expandable elements secured to said housing and adjacent said friction elements whereby said friction elements frictionally engage said friction disk upon actuating said expandable elements.

8. A hoisting apparatus as defined in claim 7 wherein said power means comprises a rotating power source, a sprocket coupled to and parallel with said drive ring and a chain drive coupling said rotating power source and said sprocket.

9. A hoisting apparatus as defined in claim 5 wherein said continuously slipping clutch is a water cooled, air actuated continuously slipping disk clutch.

10. In combination with a drawworks assembly including a rigid frame, a drum securely mounted on a drum shaft journeled on the rigid frame, a cable wound about the drum, one end thereof being secured to the drum, at least one drum clutch having a first engaging portion thereof secured to the drum shaft, a power source cooperatively coupled to the second engaging portion of the drum clutch, a combined clutch and brake assembly comprising:
   a. a liquid cooled, continuously slipping clutch assembly, having an inner hub and outer housing adapted to frictionally rotate with respect to each other, and a clutch shaft being secured to said inner hub and journeled on the rigid frame;
   b. a drive ring having an inner cylindrical hub journeled on said clutch shaft and a radially projecting ring having a first and second set of uniformly distributed gear teeth on the outer circumferential surface thereof, said ring being coupled to the housing of said continuously slipping clutch;
   c. brake stops adapted to engage the first set of gear teeth disposed upon said drive ring and secure said drive ring and said coupled housing to the rigid frame;
   d. means for coupling the secured set of gear teeth of said drive ring to the power source; and
   e. an overrunning clutch interposed and axially coupled between said clutch shaft and said drum shaft whereby said clutch shaft and said drum shaft are disengaged when the drawworks assembly is reeling in the cable, said clutch shaft and said drum shaft are engaged when the drawworks cable is being payed out, and said clutch shaft and said drum shaft are engaged when said continuously slipping clutch drives the clutch shaft to maintain the cable in a controlled tension mode.

11. A combined clutch and brake apparatus as defined in claim 10 wherein said continuously slipping clutch includes a friction disk secured to said inner hub, friction elements adapted to slidably engage and rotate with said outer housing and air actuated, expandable elements secured to said housing and adjacent said friction elements whereby said friction elements frictionally engage said friction disk upon actuating said expandable elements.

* * * * *